(12) United States Patent
Vallavanatt

(10) Patent No.: US 11,697,775 B2
(45) Date of Patent: Jul. 11, 2023

(54) SYSTEMS AND METHODS FOR DECOKING A COKER FURNACE DURING A DELAYED COKING PROCESS

(71) Applicant: Bechtel Energy Technologies & Solutions, Inc., Houston, TX (US)

(72) Inventor: Rimon Vallavanatt, Richmond, TX (US)

(73) Assignee: BECHTEL ENERGY TECHNOLOGIES & SOLUTIONS, INC., Houston, TX (US)

( * ) Notice: Subject to any disclaimer, the term of this patent is extended or adjusted under 35 U.S.C. 154(b) by 0 days.

(21) Appl. No.: 17/918,732

(22) PCT Filed: Apr. 16, 2020

(86) PCT No.: PCT/US2020/028523
§ 371 (c)(1),
(2) Date: Oct. 13, 2022

(87) PCT Pub. No.: WO2021/211126
PCT Pub. Date: Oct. 21, 2021

(65) Prior Publication Data
US 2023/0124266 A1    Apr. 20, 2023

(51) Int. Cl.
*B08B 9/053*  (2006.01)
*F16L 55/46*  (2006.01)
(Continued)

(52) U.S. Cl.
CPC .............. *C10G 9/16* (2013.01); *B08B 9/0551* (2013.01); *B08B 9/0552* (2013.01);
(Continued)

(58) Field of Classification Search
CPC ....... C10G 9/16; B08B 9/0551; B08B 9/0552; B08B 9/0557; B08B 2209/055;
(Continued)

(56) References Cited

U.S. PATENT DOCUMENTS 3,028,996 A    4/1962 Ellett
5,444,886 A    8/1995 Takashina
(Continued)

FOREIGN PATENT DOCUMENTS

| CH | 707834 A2 | * | 9/2014 | .......... B08B 9/0436 |
| DE | 19837032 A1 | * | 2/2000 | ............ B08B 9/055 |
| WO | WO-2020024030 A1 | * | 2/2020 | ............ B61B 13/10 |

OTHER PUBLICATIONS

Thomas, Shane, International Search Report and Written Opinion for PCT/US20/28523, dated Jul. 16, 2020, 12 pages, United States Patent Office as the International Searching Authority, Alexandria, VA.

(Continued)

*Primary Examiner* — Alexander Markoff
(74) *Attorney, Agent, or Firm* — Crain Caton & James; William P. Jensen

(57) ABSTRACT

Systems and methods for efficient on-line pigging of a coker furnace without interruption of the delayed coking process, which will save time and money during the delayed coking process. This system can be retrofitted to existing coker furnaces.

18 Claims, 2 Drawing Sheets

(51) Int. Cl.
*C10B 43/06* (2006.01)
*C10G 9/16* (2006.01)
*F16L 55/40* (2006.01)
*B08B 9/055* (2006.01)
*C10B 55/00* (2006.01)
*F16L 101/12* (2006.01)

(52) U.S. Cl.
CPC ............ B08B 9/0557 (2013.01); C10B 43/06 (2013.01); F16L 55/40 (2013.01); F16L 55/46 (2013.01); *B08B 2209/055* (2013.01); *C10B 55/00* (2013.01); *F16L 2101/12* (2013.01)

(58) Field of Classification Search
CPC .......... C10B 43/06; C10B 55/00; F16L 55/40; F16L 55/46; F16L 2101/12
See application file for complete search history.

(56) References Cited

U.S. PATENT DOCUMENTS

| | | |
|---|---|---|
| 5,685,041 A | 11/1997 | Sivacoe |
| 2001/0042623 A1 | 11/2001 | Reynolds |
| 2004/0194809 A1* | 10/2004 | Crawford ............. B08B 9/0557 134/22.12 |
| 2012/0255933 A1 | 10/2012 | McKay |
| 2017/0174996 A1 | 6/2017 | Doerksen et al. |
| 2021/0372556 A1* | 12/2021 | Salvi Dos Reis ....... F16L 55/40 |

OTHER PUBLICATIONS

Markoff, Alexander, International Preliminary Report on Patentability for PCT/US20/28523, Mar. 16, 2022, 23 pages, United States Patent Office as the International Preliminary Examination Authority, Alexandria, VA.

* cited by examiner

SYSTEMS AND METHODS FOR DECOKING A COKER FURNACE DURING A DELAYED COKING PROCESS

CROSS-REFERENCE TO RELATED APPLICATIONS

This application is a U.S. National Stage Application of PCT Application Serial No. PCT/US20/28523 filed on Apr. 16, 2020, which is incorporated herein by reference.

FIELD OF THE DISCLOSURE

The following disclosure generally relates to systems and methods for decoking a coker furnace during a delayed coking process. More particularly, the systems and methods permit efficient on-line pigging of a coker furnace without interruption of the delayed coking process.

BACKGROUND

Delayed coking is a process used in many oil refineries to heat a residual oil feed to its thermal cracking temperature in a coker furnace. This cracks the heavy, long chain hydrocarbon molecules of the residual oil feed into coker gas oil and petroleum coke. The yield of coke from the delayed coking process ranges from about 18 to 30 percent by weight of the residual oil feed, depending on its composition and operating variables. A single coker furnace typically has four to six tube passes per pair of coke drums. The passes are parallel tubes that the residual oil feed flows through. It is not usual for one or more of these passes to become constricted due to coke build-up during use at around 800° F. This is a soft and thin layer, but with time builds up, hardens and acts as an insulation. As the coke hardens, the coker furnace must fire harder to maintain the required process outlet temperature. This results in a rise in the tube wall temperature until it reaches a maximum safe operating temperature requiring the removal of the coke build-up.

Removal of this coke buildup is referred to as "decoking." Decoking may be necessary three to four times a year per furnace. Decoking has historically been performed off-line, meaning the coke drums (typically two) and each furnace would have to be fully shut down in order to decoke the coker furnace tubes. In some furnace designs one tube pass goes through the decoking process while the other passes are still in operation. Decoking may be performed by use of steam air forced through the tubes or by mechanically removing the coke with scrapers driven through the tubes by water (typically referred to as 'pigging'). In either case, offline decoking is time consuming (3 to 5 days), expensive and results in delayed productivity due to the shut-down.

More recently, on-line decoking has been used to avoid the delays and expense associated with off-line decoking. If the heater has more than one parallel passes, one pass can be isolated for on-decoking, while the other passes are in operation resulting in reduced capacity. On-line decoking also presents significant operational, commercial and structural issues, such as safe transitioning among process steps and ensuring components can provide the safety factors needed for on-line decoking.

BRIEF DESCRIPTION OF THE DRAWINGS

The detailed description is described with reference to the accompanying drawings, in which like elements are referenced with like reference numbers, and in which.

DETAILED DESCRIPTION OF THE ILLUSTRATIVE EMBODIMENTS

Figure 1:
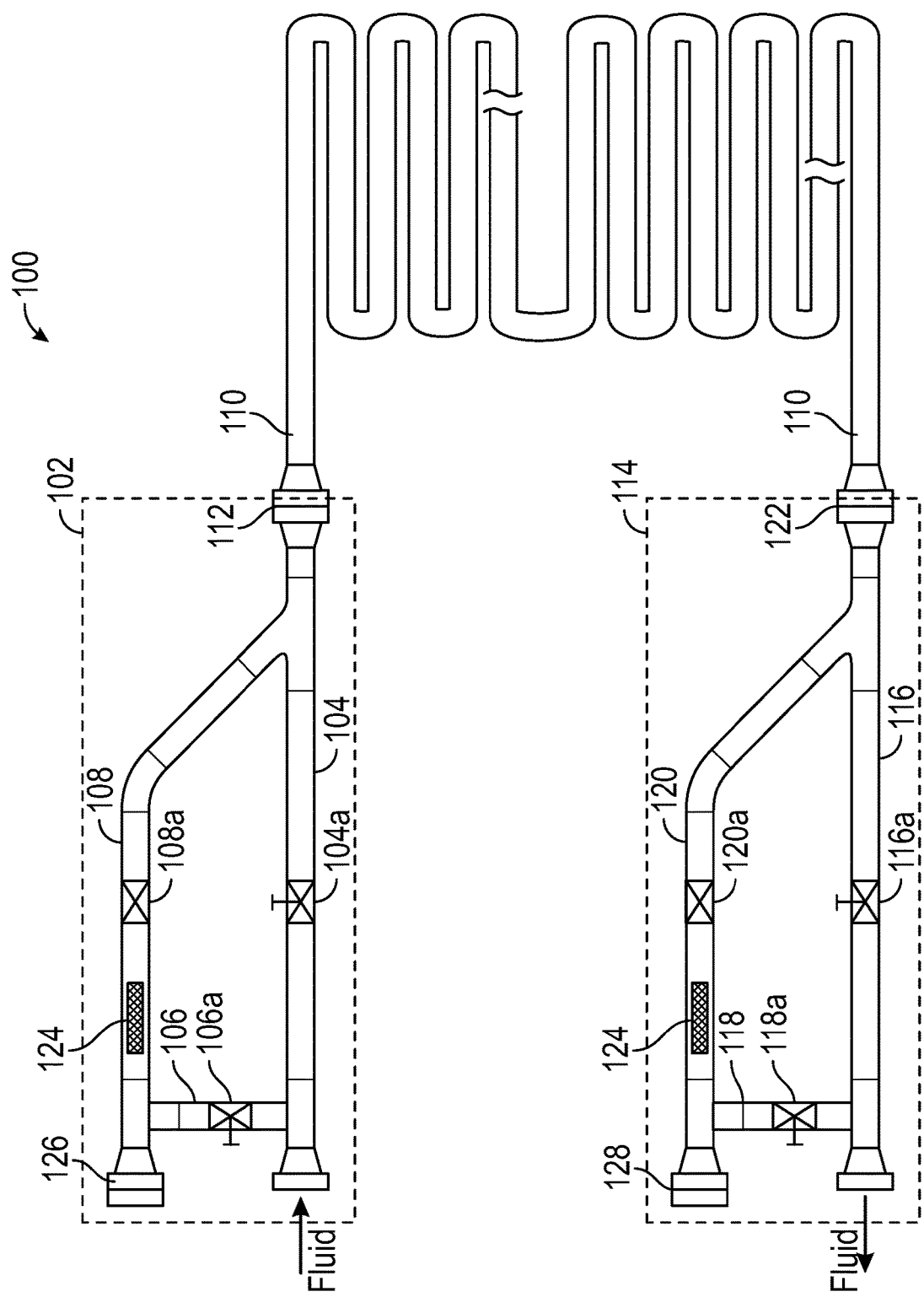
FIG. 1 is a schematic diagram illustrating a system for efficient on-line pigging of a coker furnace without interruption of the delayed coking process.

The subject matter disclosed herein is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will thus, be or become apparent to one of ordinary skill in the art upon examination of the following figures and detailed description. It is intended that all such features and advantages be included within the scope of the disclosed embodiments. Further, the illustrated figures are only exemplary and are not intended to assert or imply any limitation with regard to the environment, architecture, design, or process in which different embodiments may be implemented. To the extent that temperatures and pressures are referenced in the following description, those conditions are merely illustrative and are not meant to limit the disclosure.

The embodiments disclosed herein overcome the prior art disadvantages by permitting efficient on-line pigging of a coker furnace without interruption of the delayed coking process, which will save time and money during the delayed coking process. While the embodiments disclosed herein are applied to clean a coker furnace during a delayed coking process, the present disclosure is not limited thereto and may also be applied to clean other tubular components used in extreme temperatures.

In one embodiment, the present disclosure includes a system for on-line pigging, which comprises: i) a first tubular assembly having a first passage, a second passage and a third passage, wherein the first passage of the first tubular assembly is connected at one end to a first end of a tubular segment and each passage includes a respective valve for controlling fluid communication through each passage and the tubular segment; ii) a second tubular assembly having a first passage, a second passage and a third passage, wherein the first passage of the second tubular assembly is connected at one end to a second end of the tubular segment and each passage includes a respective valve for controlling fluid communication through each passage; a pig for traversing the third passage of the first tubular assembly, cleaning the tubular segment during normal operation of the tubular segment and traversing the third passage of the second tubular assembly when the pig is carried by a fluid under pressure; and iv) wherein the pig comprises a plurality of wooden discs and a plurality of ceramic cloth discs joined together, or a tightly wound rope with a diameter that is greater than an inside diameter of the third passage of the first tubular assembly, the tubular segment and the third passage of the second tubular assembly.

In another embodiment, the present disclosure includes a method for on-line pigging, which comprises: i) introducing a fluid under pressure through a first passage of a first tubular assembly, a tubular segment and a first passage of a second tubular assembly, wherein the first passage of the first tubular assembly is connected at one end to a first end of the tubular segment and the first passage of the second tubular assembly is connected at one end to a second end of the tubular segment; ii) introducing a pig into a third passage of the first tubular assembly that is isolated from the fluid in the first passage of the first tubular assembly by a valve in a second passage of the first tubular assembly and a valve in the third passage of the first tubular assembly; iii) wherein the pig comprises a plurality of wooden discs and a plurality of ceramic cloth discs joined together, or a tightly wound rope with a diameter that is greater than an inside diameter of the third passage of the first tubular assembly, the tubular segment and the third passage of the second tubular assembly; iv) redirecting the fluid through the third passage of the first tubular assembly behind the pig by closing the valve in the first passage of the first tubular assembly and opening the valves in the second passage and the third passage of the first tubular assembly; v) cleaning the tubular segment with the pig carried by the fluid under pressure during normal operation of the tubular segment; vi) redirecting the fluid through a third passage of the second tubular assembly by closing a valve in the first passage of the second tubular assembly and opening a valve in a second passage and a valve in the third passage of the second tubular assembly; and vii) extracting the pig from the third passage of the second tubular assembly after the pig passes the valve in the third passage of the second tubular assembly by closing the valves in the second passage and the third passage of the second tubular assembly and opening the valve in the first passage of the second tubular assembly.

Referring now to FIG. 1, the schematic diagram illustrates a system 100 for efficient on-line pigging of a coker furnace without interruption of the delayed coking process. The system 100 comprises a first tubular assembly 102 having a first passage 104, a second passage 106 and a third passage 108, wherein the first passage 104 is connected at one end to a first end of a tubular segment 110 that forms a flange 112. The tubular segment 110 may be linear or curvilinear. Each passage includes a respective valve 104a, 106a and 108a for controlling fluid communication through each passage and the tubular segment 110. The third passage 108 includes another end connected to the first passage 104, wherein the first passage 104 and the third passage 108 are preferably parallel for most of a respective length of each. The second passage 106 connects the first passage 104 and the third passage 108 upstream from the valve 104a for the first passage 104 and the valve 108a for the third passage 108. The second passage 106 is substantially perpendicular to the first passage 104 and the third passage 108.

The system 100 further comprises a second tubular assembly 114 having a first passage 116, a second passage 118, and a third passage 120, wherein the first passage 116 is connected at one end to a second end of the tubular segment 110 that forms a flange 122. Each passage includes a respective valve 116a, 118a and 120a for controlling fluid communication through each passage. The third passage 120 includes another end connected to the first passage 116, wherein the first passage 116 and the third passage 120 are preferably parallel for most of a respective length of each. The second passage 118 connects the first passage 116 and the third passage 120 downstream from the valve 116a for the first passage 116 and the valve 120a for the third passage 120. The second passage 118 is substantially perpendicular to the first passage 116 and the third passage 120.

The system 100 may utilize a pig 124 for traversing the third passage 108 of the first tubular assembly 102, cleaning the tubular segment 110 during normal operation of the tubular segment 110 and traversing the third passage 120 of the second tubular assembly 114 when the pig 124 is carried by a fluid under pressure. The third passage 108 of the first tubular assembly 102 and the third passage 120 of the second tubular assembly 114 each include an end with a removable blind flange 126, 128, respectively, for inserting and extracting the pig 124, respectively. Each valve 104a, 106a, 108a, 116a, 118a and 120a may be connected to a central control panel for independent control.

Figure 2:
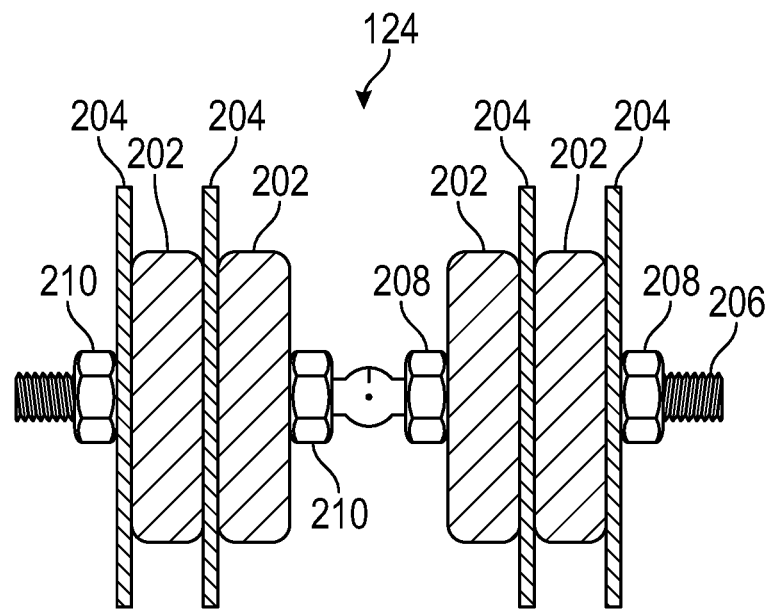
FIG. 2 is a cross-sectional side view of one embodiment of a pig that may be used with the system illustrated in FIG. 1.

Referring now to FIG. 2, a cross-sectional side view illustrates one embodiment of a pig 124 that may be used with the system 100. The pig 124 comprises a plurality of wooden discs 202 and a plurality of ceramic cloth discs 204 joined together by a threaded bolt 206. A first set of wooden discs 202 and ceramic cloth discs 204 are secured at one end of the threaded bolt 206 by a pair of nuts 208. A second set of wooden discs 202 and ceramic cloth discs 204 are secured at another end of the threaded bolt 206 by a pair of nuts 210. The total length of the pig 124 is about 8 inches. Each wooden disc 202 has a predetermined thickness of about 1 inch and a diameter that is less than or equal to an inside diameter of the third passage 108 of the first tubular assembly 102, the tubular segment 110 and the third passage 120 of the second tubular assembly 114. Each ceramic cloth disc 204 has a predetermined thickness of about ⅜ of an inch and a diameter that is about ¼ inch greater than the inside diameter of the third passage 108 of the first tubular assembly 102, the tubular segment 110 and the third passage 120 of the second tubular assembly 114. Alternatively, the plurality of ceramic cloth discs 204 may be replaced with a plurality of wire mesh discs of substantially the same size and dimensions.

Figure 3:
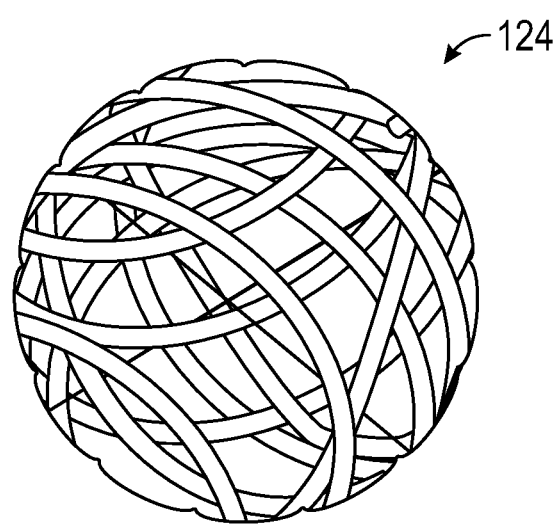
FIG. 3 is a cross-sectional side view of another embodiment of a pig that may be used with the system illustrated in FIG. 1.

Referring now to FIG. 3, a cross-sectional side view illustrates another embodiment of a pig 124 that may be used with the system 100. The pig 124 comprises a tightly wound natural nautical rope 302 that is about 3 mm in diameter. The pig 124 has a diameter that is greater than an inside diameter of the third passage 108 of the first tubular assembly 102, the tubular segment 110 and the third passage 120 of the second tubular assembly 114.

The system 100 may be used to introduce a fluid under pressure through the first passage 104 of the first tubular assembly 102, the tubular segment 110 and the first passage 116 of a second tubular assembly 114. In this stage of operation, valve 104a in the first passage 104 of the first tubular assembly 102 and valve 116a in first passage 116 of a second tubular assembly 114 are open while the remaining valves are closed. The pig 124 is then introduced into the third passage 108 of the first tubular assembly 102 by removing the blind flange 126. The pig 124 is thus, isolated from the fluid in the first passage 104 by valves 106a and 108a that are closed.

The fluid in the first passage 104 of the first tubular assembly 102 is then redirected through the third passage 108 of the first tubular assembly 102 behind the pig 124 by closing valve 104a and opening the valves 106a, 108a. Likewise, the fluid in the first passage 116 of the second tubular assembly 114 is redirected through the third passage 120 of the second tubular assembly 114 by closing valve 116a and opening valves 118a,120a. In this stage of operation, the pig 124 is able to pass through the system 100 and clean tubular segment 110 at a temperature of at least about 925° F. as it is carried by the fluid under pressure during normal operation of the tubular segment 110.

Once the pig 124 has completed the process of cleaning the tubular segment 110 and passes valve 120a in the third passage 120 of the second tubular assembly 114, it may be isolated by closing the valves 118a, 120a and opening valve 116a. Similarly, valves 106a and 108a in the second passage 106 and the third passage 108 of the first tubular assembly 102 may be closed and valve 104a may be opened. At this stage, the system returns to its initial state of operation and the pig 124 may be extracted from the third passage 120 of the second tubular assembly 114 by removing the blind flange 128. The pig 124 is thus, isolated from the fluid in the first passage 116 by valves 118a and 120a that are closed.

Each valve 104a, 106a, 108a, 116a, 118a and 120a may be independently controlled by a central control panel and/or may be programed to open and close based on a location of the pig. Alternatively, each valve may be programmed to open and close based on at least one of a location of the pig and a status of at least one other valve with respect to its being opened or closed.

Although the system 100 may be applied to clean many different types of tubular segments, one particularly useful application includes cleaning the tubular segment(s) contained within a coker furnace. In this application, crude oil is pumped from a main fractionator along with some injected steam into the fuel fired coker furnace. The crude oil enters the tubular segment 110 in the coker furnace at about 585° F. through flange 112 where it is heated in the coker furnace to its thermal cracking temperature and exits through flange 122 at about 925° F. The pig 124 efficiently cleans the tubular segment 110 while coke is still soft and thin before it gets hard and thick.

The system 100 may be easily incorporated in a new delayed coking process or retrofitted to an existing coker furnace by simply connecting the first passage 104 of the first tubular assembly 102 to one end of the tubular segment 110 and the first passage 116 of the second tubular assembly 114 to another end of the tubular segment 110 when the coker furnace is not operating. Once installed, the system 100 need not be removed even after the cleaning process. However, all process temperature probes should be removed or withdrawn from the path of the pig 124, which may include the capacity to scan the thickness of the tubular segment 110 while it passes therethrough. The material for the first tubular assembly 102 and the second tubular assembly 114 can be P11 or the same material as the material outside the coker furnace provided it meets the B31.3 code.

While the present disclosure has been described in connection with forgoing embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A system for on-line pigging, which comprises:
a first tubular assembly having a first passage, a second passage and a third passage, wherein the first passage of the first tubular assembly is connected at one end to a first end of a tubular segment and each passage includes a respective valve for controlling fluid communication through each passage and the tubular segment;
a second tubular assembly having a first passage, a second passage and a third passage, wherein the first passage of the second tubular assembly is connected at one end to a second end of the tubular segment and each passage includes a respective valve for controlling fluid communication through each passage;
a pig for traversing the third passage of the first tubular assembly, cleaning the tubular segment during normal operation of the tubular segment and traversing the third passage of the second tubular assembly when the pig is carried by a fluid under pressure; and
wherein the pig comprises a plurality of wooden discs and a plurality of ceramic cloth discs joined together, or a tightly wound rope with a diameter that is greater than an inside diameter of the third passage of the first tubular assembly, the tubular segment and the third passage of the second tubular assembly.

2. The system of claim 1, wherein the tubular segment is linear or curvilinear.

3. The system of claim 1, wherein the third passage of the first tubular assembly and the third passage of the second tubular assembly each include an end with a removable blind flange for inserting and extracting the pig, respectively.

4. The system of claim 3, wherein the third passage of the first tubular assembly and the third passage of the second tubular assembly each include another end connected to the first passage of the first tubular assembly and the first passage of the second tubular assembly, respectively.

5. The system of claim 1, wherein the first passage and the third passage of the first tubular assembly and the first passage and the third passage of the second tubular assembly are parallel for most of a respective length of each.

6. The system of claim 5, wherein the second passage of the first tubular assembly connects the first passage and the third passage of the first tubular assembly upstream from the valve for the first passage and the valve for the third passage of the first tubular assembly.

7. The system of claim 5, wherein the second passage of the second tubular assembly connects the first passage and the third passage of the second tubular assembly downstream from the valve for the first passage and the valve for the third passage of the second tubular assembly.

8. The system of claim 5, wherein the second passage of the first tubular assembly and the second passage of the second tubular assembly are substantially perpendicular to the first passage and the third passage of the first tubular assembly and the second tubular assembly, respectively.

9. The system of claim 1, wherein each wooden disc has a predetermined thickness and a diameter that is less than or equal to an inside diameter of the third passage of the first tubular assembly, the tubular segment and the third passage of the second tubular assembly.

10. The system of claim 9, wherein each ceramic cloth disc has a predetermined thickness and a diameter that is greater than the inside diameter of the third passage of the first tubular assembly, the tubular segment and the third passage of the second tubular assembly.

11. The system of claim 1, wherein each valve is connected to a central control panel for independent control.

12. A method for on-line pigging, which comprises:
introducing a fluid under pressure through a first passage of a first tubular assembly, a tubular segment and a first passage of a second tubular assembly, wherein the first passage of the first tubular assembly is connected at one end to a first end of the tubular segment and the first passage of the second tubular assembly is connected at one end to a second end of the tubular segment;

introducing a pig into a third passage of the first tubular assembly that is isolated from the fluid in the first passage of the first tubular assembly by a valve in a second passage of the first tubular assembly and a valve in the third passage of the first tubular assembly;

wherein the pig comprises a plurality of wooden discs and a plurality of ceramic cloth discs joined together, or a tightly wound rope with a diameter that is greater than an inside diameter of the third passage of the first tubular assembly, the tubular segment and the third passage of the second tubular assembly;

redirecting the fluid through the third passage of the first tubular assembly behind the pig by closing the valve in the first passage of the first tubular assembly and opening the valves in the second passage and the third passage of the first tubular assembly;

cleaning the tubular segment with the pig carried by the fluid under pressure during normal operation of the tubular segment;

redirecting the fluid through a third passage of the second tubular assembly by closing a valve in the first passage of the second tubular assembly and opening a valve in a second passage and a valve in the third passage of the second tubular assembly; and extracting the pig from the third passage of the second tubular assembly after the pig passes the valve in the third passage of the second tubular assembly by closing the valves in the second passage and the third passage of the second tubular assembly and opening the valve in the first passage of the second tubular assembly.

13. The method of claim 12, wherein a temperature of the tubular segment during normal operation is at least about 925° F.

14. The method of claim 12, wherein the tubular segment is contained within a coker furnace.

15. The method of claim 14, further comprising connecting the first passage of the first tubular assembly to the first end of the tubular segment and the first passage of the second tubular assembly to the second end of the tubular segment when the coker furnace is not operating.

16. The method of claim 12, wherein each valve is independently controlled by a central control panel.

17. The method of claim 16, wherein each valve is programed to open and close based on a location of the pig.

18. The method of claim 16, wherein each valve is programmed to open and close based on at least one of a location of the pig and a status of at least one other valve with respect to its being opened or closed.

* * * * *